United States Patent [19]
Ikeda et al.

[11] Patent Number: 5,590,039
[45] Date of Patent: Dec. 31, 1996

[54] NATURAL LANGUAGE PROCESSING APPARATUS AND METHOD FOR PERFORMING PROCESSING TO ANALYZE THE MEANING OF AN INPUT SENTENCE ENTERED IN THE FORM OF A NATURAL LANGUAGE

[75] Inventors: Yuji Ikeda; Minoru Fujita, both of Yokohama, Japan

[73] Assignee: Canon Kabushiki Kaisha, Tokyo, Japan

[21] Appl. No.: 296,159

[22] Filed: Aug. 29, 1994

Related U.S. Application Data

[63] Continuation of Ser. No. 982,070, Nov. 25, 1992, abandoned, which is a continuation of Ser. No. 594,954, Oct. 10, 1990, abandoned.

[30] Foreign Application Priority Data

Oct. 14, 1989 [JP] Japan ................................. 1-267515

[51] Int. Cl.$^6$ .................................................... G06F 17/28
[52] U.S. Cl. .......................... 395/759; 395/752; 395/761
[58] Field of Search ...................... 364/419.02, 419.08, 364/200 MS File, 900 MS File, 203, 419.01, 419.10–419.12

[56] References Cited

U.S. PATENT DOCUMENTS

| | | | |
|---|---|---|---|
| 4,942,526 | 7/1990 | Okajima et al. | 364/419 |
| 4,980,829 | 12/1990 | Okajima et al. | 364/419.08 |
| 5,056,021 | 10/1991 | Ausborn | 364/419 |
| 5,088,038 | 2/1992 | Tanaka et al. | 364/419.02 |
| 5,101,349 | 3/1992 | Tokuume et al. | 364/419 |
| 5,136,503 | 8/1992 | Takagi et al. | 364/419.02 |
| 5,369,574 | 11/1994 | Masegi et al. | 364/419.08 |
| 5,408,410 | 4/1995 | Kaji | 364/419.02 |

FOREIGN PATENT DOCUMENTS

| | | |
|---|---|---|
| 0244871 | 11/1987 | European Pat. Off. . |
| 0266001 | 5/1988 | European Pat. Off. . |

OTHER PUBLICATIONS

"Outline of Machine Translation Project of the Science and Technology Agency", by Makoto, Nagao et al., Information Processing, vol. 26, No. 10, pp. 1203–1213, Oct., 1985.

The Second International Conference on Computers and Applications, "A Massively Parallel Network–Based Natural Language Parsing System", T. Li et al., pp. 401–408 (Jun. 23, 1987).

Computational Linguistics, "An Efficient Augmented–Context–Free Parsing Algorithm", vol. 13, No. 1–2, pp. 31–46 (Jan. 1987).

*Primary Examiner*—Donald E. McElheny, Jr.
*Assistant Examiner*—Frantzy Poinvil
*Attorney, Agent, or Firm*—Fitzpatrick, Cella, Harper & Scinto

[57] ABSTRACT

A natural language processing apparatus for performing processing operations to analyze the meaning of an input sentence entered in the form of a natural language includes a plurality of meaning analyzing devices networked in order to perform processing to analyze the meaning of the input sentence. The meaning analyzing devices perform meaning analyzing operations that differ from one another and output the results of analysis on a network. Also provided is a communicating device for applying the input sentence, which is a subject of analysis, to each of the plurality of meaning analyzing devices, a decision device for determining whether independent meaning analysis performed by the plurality of meaning analyzing devices is required with regard to the input sentence, and a consolidating device for consolidating the analytical results from each of the plurality of meaning analyzing devices and applying the consolidated results to the communicating device as the subject of analysis which the communicating device applies to each of the meaning analyzing devices.

6 Claims, 8 Drawing Sheets

NATURAL LANGUAGE PROCESSING APPARATUS AND METHOD FOR PERFORMING PROCESSING TO ANALYZE THE MEANING OF AN INPUT SENTENCE ENTERED IN THE FORM OF A NATURAL LANGUAGE

This application is a continuation of application Ser. No. 07/982,070 filed Nov. 25, 1992, now abandoned, which is a continuation of application Ser. No. 07/594,954 filed Oct. 10, 1990, now abandoned.

BACKGROUND OF THE INVENTION

This invention relates to a natural language processing apparatus which utilizes a knowledge of linguistics to analyze the meaning of inputted written sentences comprising a natural language. More particularly, the invention relates to an apparatus for machine translation capable of translating a certain language into another language.

Systems which analyze the meaning of a natural language using a computer have been the subject of research and development in recent years.

The construction of a natural language processing apparatus according to the prior art will now be described with reference to FIGS. 1 and 2.

The conventional natural language processing apparatus shown in FIG. 1 is provided with an input sentence 301 in a natural language. An expression of meaning (or a conceptual structure) possessed by this sentence is extracted from the sentence. (Hereinafter, an expression of meaning shall be referred to as a "meaning expression".) More specifically, a morpheme analyzing unit 302 divides the input sentence 301 into morphemes, which serve as basic units, investigates the grammatical attribute (part of speech or conjugation) of each morpheme while referring to a dictionary, and assigns the checked attribute information to each morpheme. The sentence which has undergone this morpheme analysis in the morpheme analyzing unit 302 is delivered to a sentence-structure analyzing unit 303. The latter analyzes the syntactic structure of the input sentence based on the results of the morpheme analysis. That is, the unit 303 analyzes the morphemes and the dependence relationship between the morphemes and the sentence structure, and delivers the information obtained by this analysis to a meaning analyzing unit 304. The latter analyzes the meaning relationship of the input sentence from the results of analysis provided by the sentence-structure analyzing unit 303 to obtain its "meaning expression".

This "meaning expression" represents the conceptual structure of the input sentence. The results of processing performed by the language processing apparatus of the kind shown in FIG. 1 are utilized in a so-called transfer-type translating apparatus, as described in U.S. Pat. No. 5,101,349, by way of example. In order to translate one language into another language in a transfer-type translating apparatus, "meaning expressions" of the original language are converted into (transferred to) "meaning expressions" in the target language, after which a translated sentence is generated. These meaning expressions are intermediate expressions, namely expressions intermediate the input sentence and the translated sentence.

FIG. 2 illustrates the construction of the meaning analyzing unit 304 in greater detail.

The meaning analyzing unit 304 includes four analyzers connected sequentially. Specifically, when a noun-phrase range analyzer 401 accepts, as syntactic information, the results of sentence-structure analysis performed by the sentence-structure analyzing unit 303, the analyzer 401 performs analysis that is for deciding the range of a portion constituted by a noun phrase. A modification structure analyzer 402 accepts the results of this analysis and proceeds to analyze the modification structure in the text of the noun phrase. An inter-sentence meaning analyzer 403 analyzes the meaning relationship among a plurality of sentences, and a tense/aspect analyzer 404 analyzes the tense/aspect of the input sentence.

For a detailed description of the processing executed by the conventional meaning analyzing unit mentioned above, see the "Summary of the Machine Translation Project of the Science and Technology Agency" by Makoto Nagao, et. al (Information Processing, Vol. 26, No. 10, pp. 1203–1213).

The meaning analyzing unit of FIG. 2 has a plurality of analyzers which perform partial meaning analysis. This is carried out through the following sequence: analysis of noun-phrase range→analysis of modification structure→analysis of inter-sentence meaning→analysis of tense/aspect. A variety of other meaning analyzing units having an architecture which embraces such a plurality of analyzers have been proposed. In all of these units, meaning analyzing processing is executed in accordance with a fixed processing sequence at all times. In processing for analyzing the meaning of a natural language, the reason for performing the aforementioned partial meaning analysis in a given sequence is that the results of other specific partial analytical processing operations are required at the start of a certain analytical processing operation in order to obtain correct results.

However, the requirement in the prior-art meaning analyzing unit that the execution sequence of partial analytical processing always be fixed results in the following disadvantages.

(1) There are cases where correct analysis cannot be performed in the set sequence. The reason is that since an expression in a natural language has a complicated structure, there are instances where correct results are not obtained by following the aforementioned sequence, namely analysis of noun-phrase range→analysis of modification structure→analysis of inter-sentence meaning→analysis of tense/aspect, by way of example. For instance, in the example of FIG. 2, the analysis of associated structure is performed only one time, though there can be situations where this analysis must be performed twice. More specifically, for a specific phenomenon of language, there are instances where it is necessary to apply the partial analytical processor in a sequence different from that of an ordinary phenomenon of language.

(2) If it is attempted to avoid the disadvantage (1) described above while observing the rule that all processing be performed through the fixed procedure, then it will be necessary to make one processor which performs partial analytical processing bear the burden of two or more analytical processing operations. This has the effect of greatly complicating the processing of the processor which is made to bear these additional processing operations.

(3) In cases where the analytical processing added owing to (2) above becomes unnecessary or where a specific partial analytical processor must be corrected or modified, it is difficult to extract, or to revise a portion of the function of the specific partial analytical processor.

SUMMARY OF THE INVENTION

Accordingly, an object of the present invention is to provide a natural language processing apparatus having a plurality of meaning analyzing means for performing independent meaning analysis, in which, in conformity with an inputted natural-language sentence to be analyzed, meaning analysis can be carried out by the most suitable sequence among the plurality of meaning analyzing means.

Another object of the present invention is to provide a natural language processing apparatus having a plurality of meaning analyzing means for performing independent meaning analysis, in which modifications and revisions in terms of the construction of the meaning analyzing means can be performed freely.

According to the present invention, the foregoing objects are attained by providing a natural language processing apparatus comprising: a plurality of meaning analyzing means networked in order to perform processing for analyzing the meaning of an input sentence, the meaning analyzing means performing meaning analyzing processing operations that differ from one another and outputting the results of analysis on a network; communicating means for applying an input sentence, which is a subject of analysis, to each of the plurality of meaning analyzing means; decision means for determining whether independent meaning analysis performed by the plurality of meaning analyzing means is necessary with regard to the input sentence; and consolidating means for consolidating the analytical results from each of the plurality of meaning analyzing means and applying the consolidated results to the communicating means as the subject of analysis which the communicating means applies to each of the meaning analyzing means.

In accordance with the present invention, the plurality of meaning analyzing means apply meaning analysis independently, namely in line with an optimum analytical sequence, to whatever is deemed to need analysis. The consolidating means coordinates the plurality of outputs of analytical results from the plurality of meaning analyzing means.

In an embodiment of the invention, each of the meaning analyzing means shares memory means for storing the analytical results.

In another embodiment of the invention, each of the plurality of meaning analyzing means has decision means.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENT

An embodiment in which the present invention is applied to meaning analysis of the Japanese language as one example of a natural language will now be described with reference to the accompanying drawings.

Figure 1:
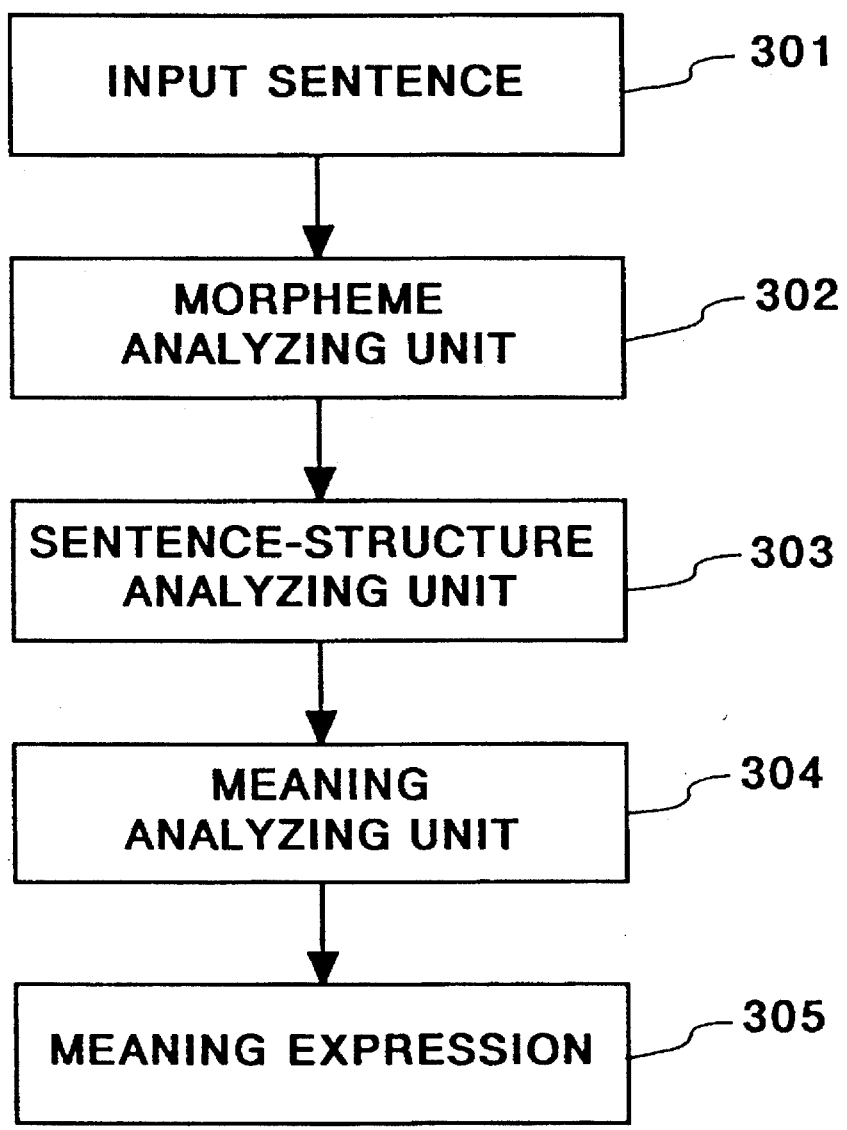
FIG. 1 is a block diagram illustrating the construction of a natural language processing apparatus according to the prior art.
Figure 2:
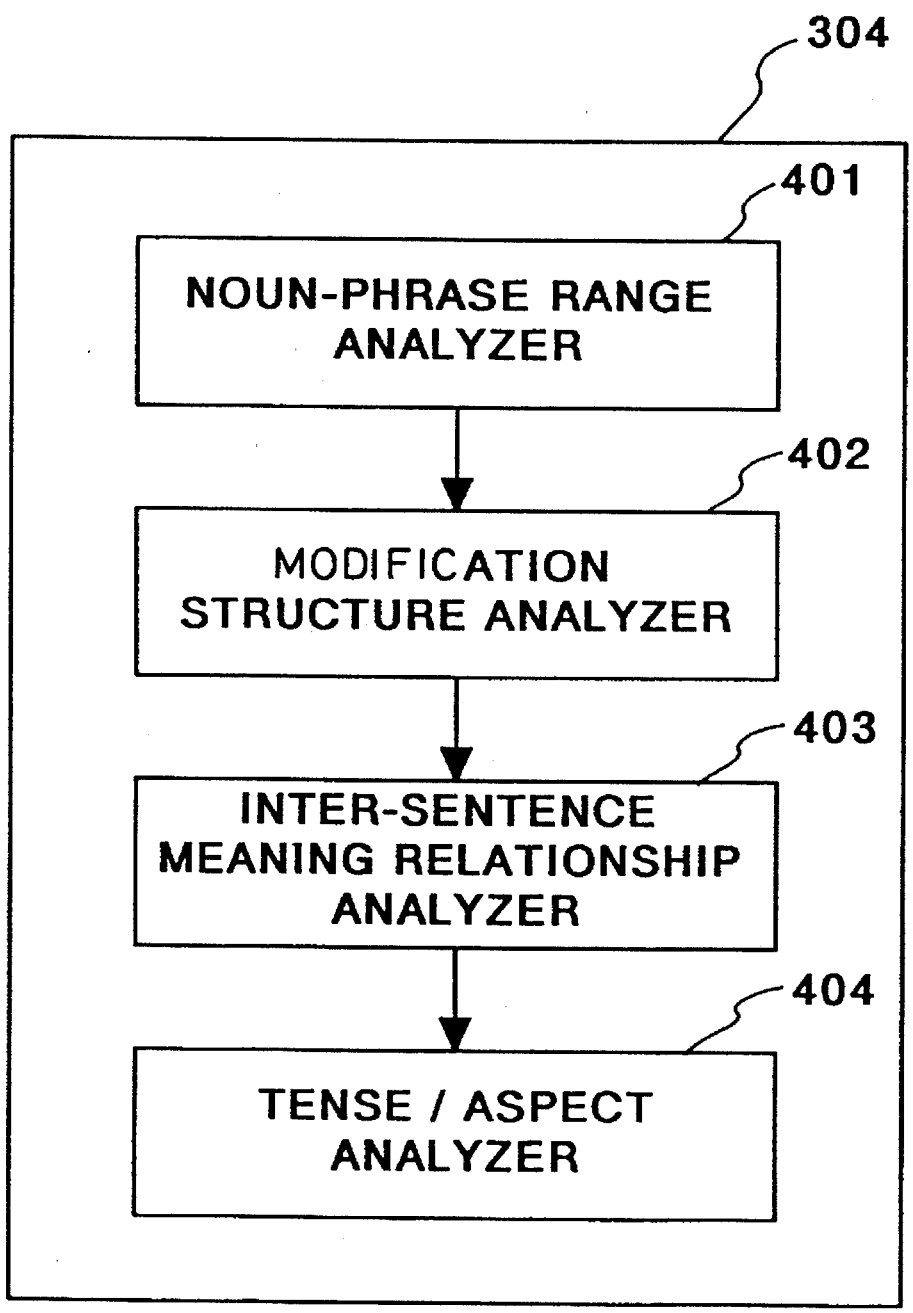
FIG. 2 is a block diagram of a meaning analyzing unit according to the prior art.
Figure 3:
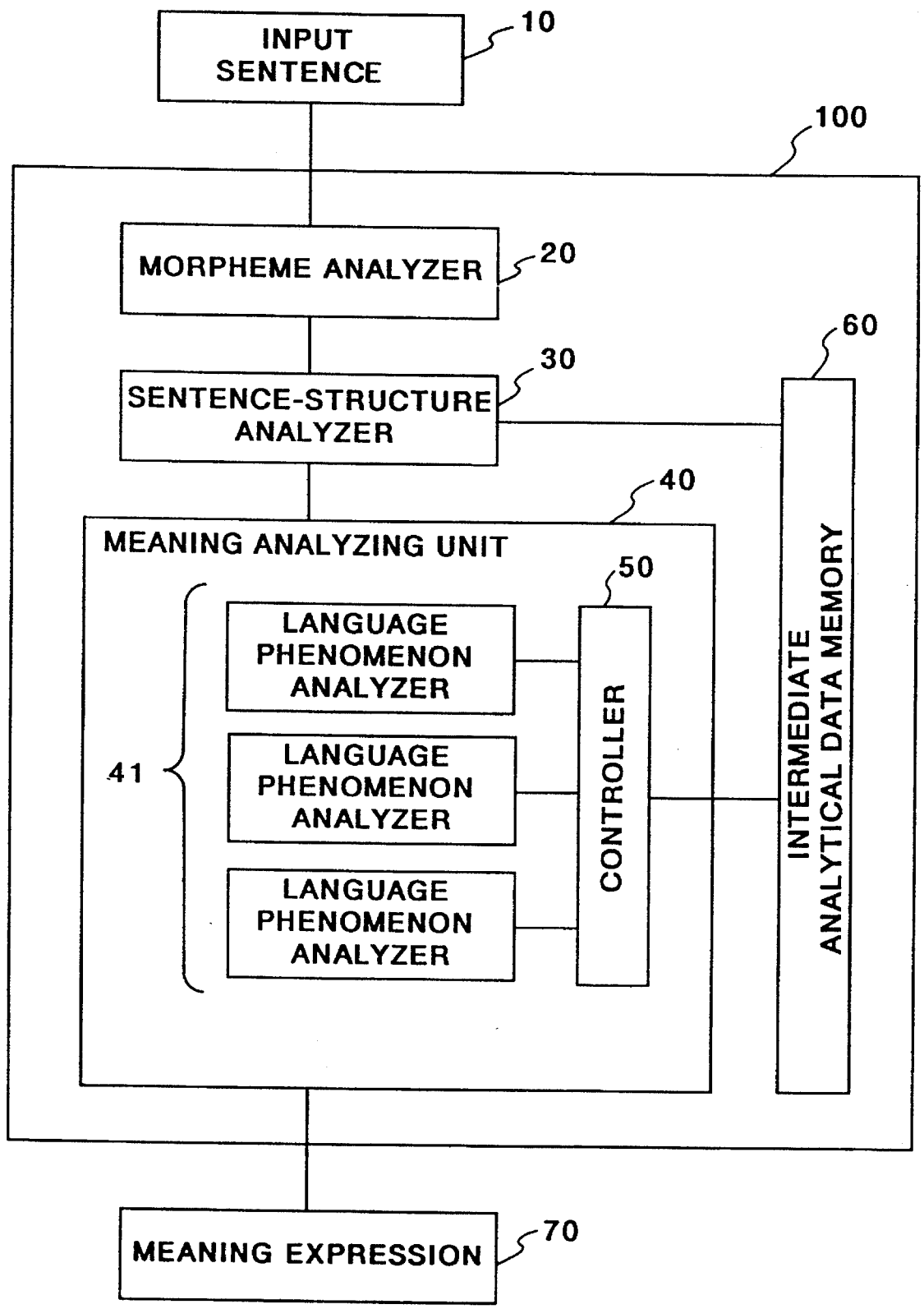
FIG. 3 is a block diagram illustrating a preferred embodiment of a natural language processing apparatus according to the present invention.

FIG. 3 is a block diagram illustrating the construction of a natural language processing apparatus 100 embodying the present invention.

The processing apparatus 100 is adapted to receive an input sentence 10, which is entered in the form of a natural language, and to output a meaning expression 70. The processing apparatus 100 comprises a morpheme analyzer 20, a sentence-structure analyzer 30, a meaning analyzer 40, and an intermediate data memory 60. The meaning analyzer 40 has a plurality of language phenomenon analyzers 41 for independently performing analytical operations that differ from one another, and a controller 50 for controlling these analyzers 41, collectively. All of the language phenomenon analyzers 41 are capable of accessing the intermediate data memory 60 via the controller 50. In other words, each analyzer 41 forms part of a network via the controller 50.

The general features of the operation performed by the processing apparatus 100 having this construction will now be described. The morpheme analyzer 20 divides the input sentence 10 into morphemes, which serve as basic units, and assigns information relating to part of speech, conjugation and the like to each morpheme. The sentence-structure analyzer 30 accepts the sentence subjected to morpheme analysis by the morpheme analyzer 20, analyzes the syntactic structure of the input sentence based on the information indicative of the results of morpheme analysis, and outputs this information to the intermediate data memory 60 as data 61 (FIG. 5) representing phrase relationship. A control feature of the invention then makes a transition from the sentence-structure analyzer 30 to the meaning analyzer 40, which analyzes the meaning relationship of the input sentence.

The construction and operation of the meaning analyzer 40, which constitutes the central point of the invention, will now be described in further detail.

Figure 4:
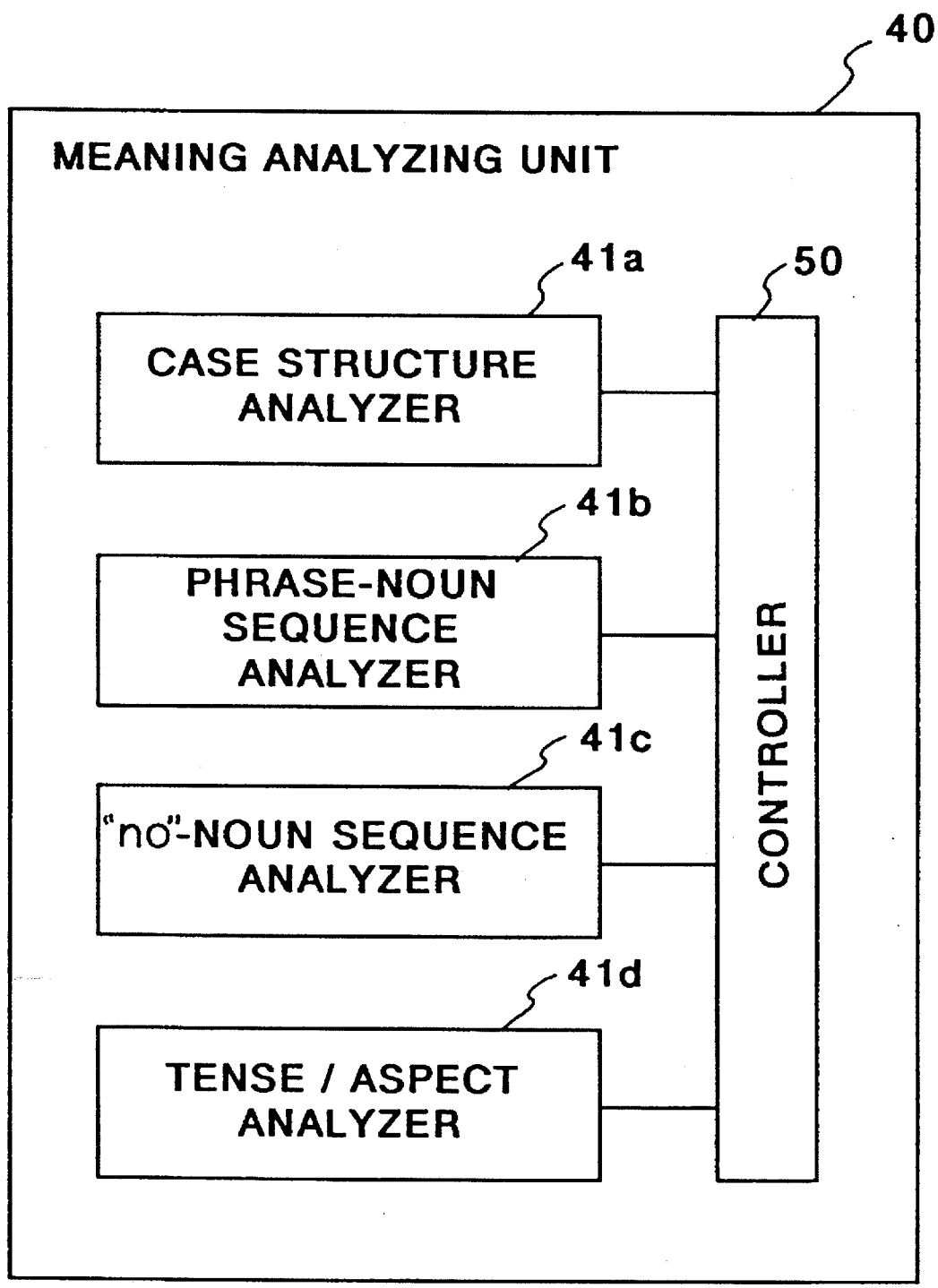
FIG. 4 is a block diagram illustrating a meaning analyzer shown in FIG. 3.

As shown in FIG. 3, the meaning analyzer 40 has the plurality of language phenomenon analyzers 41 for independently performing analytical operations that differ from one another, and the controller 50 for controlling these analyzers 41 collectively. The meaning analyzer 40 shown in FIG. 3 performs language-phenomenon analysis by performing analysis of the meaning of a natural language. This function is carried out by the plurality of language phenomenon analyzers 41. In a case where meaning analysis is applied to the Japanese language as an example of a natural language, as shown in FIG. 4, the meaning analyzer 40 has four language phenomenon analyzers, namely a case structure analyzer 41a, a phrase-noun sequence analyzer 41b, a "no"-noun sequence analyzer 41c, and a tense/aspect analyzer 41d.

Figure 5:
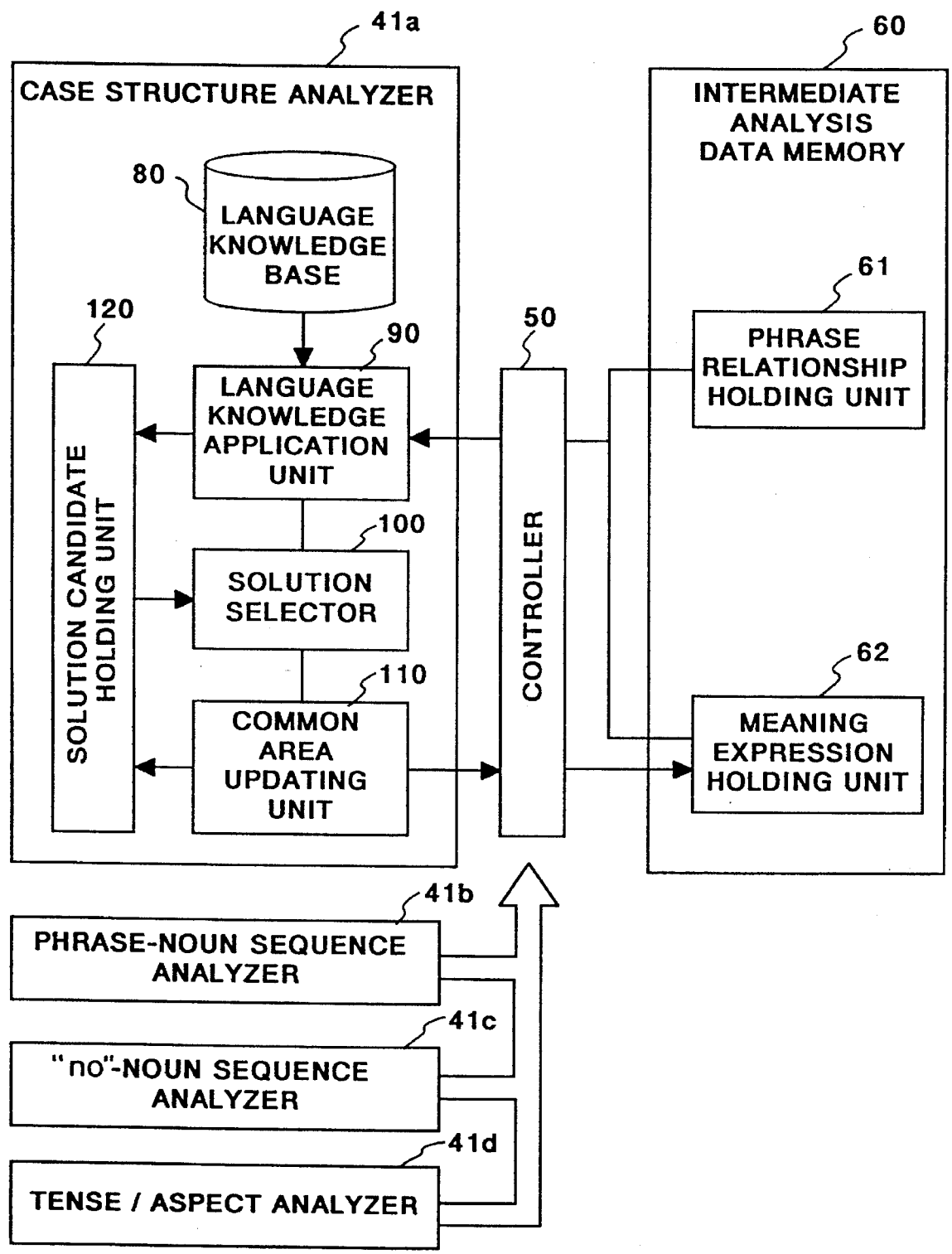
FIG. 5 is a diagram for describing the construction of the meaning analyzer in FIG. 3 and the connection between the meaning analyzer and a controller.

FIG. 5 is a diagram for describing an example of the construction of the case structure analyzer 41a as well as the connection between these analyzer and the controller 50. In FIG. 5, the other analyzers 41b through 41d have structures essentially resembling that of the case structure analyzer 41a, and the connections between these and the controller 50 is similar to those of the analyzer 41a.

Phrase-noun Sequence and "No"-noun Sequence

The following can be mentioned as some of the major differences between the Japanese language and Western languages.

(1) In the former, the predicate verb comes at the end, whereas the predicate verb follows the subject in the latter.

(2) Word order is comparatively unrestricted in the Japanese language.

(3) Ellipsis is common in the Japanese language.

(4) Individual words in a Japanese sentence are not written separate from other words in the sentence.

The problem which arises from (4) above can be solved by the analysis performed by morpheme analyzer 20. Difference (1) is dealt with by the sentence-structure analyzer 30. Problems stemming from (2) and (3) are handled mainly by the meaning analyzer 40.

In the Japanese language, word order is comparatively unrestricted owing to the existence of a postpositional particle functioning as an auxiliary to a main word (which particle will hereinafter be abbreviated to "postpositional particle"). The postpositional particle referred to here is attached to a noun or the like to constitute a clause that supplements the meaning the predicate of the sentence represents, to indicate a subject, or to function to connect words or clauses. More specifically, the postpositional particle indicates how the noun to which it is attached stands in positional relationship to the predicate or the other words in the sentence. The postpositional particle is not found in Western languages.

One example of a postpositional particle in Japanese is no. For example, when "A no B" is written in Japanese, the no can have a wide variety of meanings. It can express a possessive relationship, a place relationship, an affiliation relationship or an action relationship between A and B, it can express quantity, position and logic, the rank relationship between the two, etc. In a manner of speaking, case-postpositional particles in Japanese correspond to the prepositions "of", "with", "at", etc., in English. However, in the English expression "A of B", "B" modifies or describes "A", whereas in "A no B" in Japanese, "A" modifies "B". Thus, these English and Japanese expressions are opposites in this sense.

Thus, a postpositional particle modifies the noun or pronoun that follows it. The "no"-noun sequence analyzer 41c in FIG. 4 is adapted to analyze how the postpositional particle no modifies the noun or pronoun that follows it. Accordingly, in the present embodiment, the analyzer 41c is referred to as a "no"-noun sequence analyzer since it analyzes the no situated ahead of the noun or pronoun.

As mentioned above, the postpositional particle no has a number of meanings. The phrase-noun sequence analyzer 41b analyzes the meaning possessed by the particle and performs the conversion into the form of a phrase-noun sequence, described below.

Besides the noun (or pronoun)+post-positional particle mentioned above, a rentai-setsu can be placed before a noun or pronoun as an expression modifying the noun or pronoun in a Japanese sentence. In Western languages, the relative clause corresponds to the rentai-setsu. Therefore, a rentai-setsu shall be referred to a relative clause in this specification. A relative clause comprises a relative pronoun and a clause following the relative pronoun. In principle, a relative clause modifies a noun (or pronoun) placed immediately before the clause. Accordingly, analyzing a relative clause is comparatively simple. In the Japanese language, however, there is no counterpart to a relative pronoun. In Japanese, one sentence (or clause) often takes on the following order:

subject+object (or complement)+verb

Therefore, in order to indicate that a certain clause modifies the noun (or pronoun) that follows it, the verb at the end takes on a conjugation signifying that the noun (or pronoun) to be modified follows the verb. However, there are many cases where the conjugation cannot be distinguished from other conjugations. Accordingly, analyzing a relative clause based on the Japanese sentence containing it also is critical in the processing of the Japanese language.

In this embodiment, the unit 41b which analyzes relative clauses as described above is referred to as a "phrase-noun sequence analyzer" in view of the fact that it determines that a phrase is connected to a noun.

An important characterizing feature of this embodiment is that the case structure analysis, the phrase-noun sequence analysis, the "no"-noun sequence analysis and the tense/aspect analysis shown in FIG. 4 can be executed in an optimum order rather than by following a fixed sequence. The fact that analysis is carried out in an optimum order means that the four analytical sequences mentioned above are changed in various ways, and that a certain analysis can be repeated a plurality of times.

Construction of Meaning Analyzer

The meaning analyzer 40 has the construction shown in FIG. 5 in order to optimize the aforementioned analytical sequence.

The four analyzers 41a through 41d are connected to the intermediate analytical data memory 60 via the controller 50. The intermediate analytical data memory 60 has a storage area 61 for storing a phrase relationship and a storage area 62 for storing an intermediate meaning expression, as shown in FIG. 5.

The controller 50 monitors the data in these storage areas, selects, from one of the four analyzers 41a through 41d, the best (language phenomenon) analyzer to be executed at this time, and causes this analyzer to execute the required processing. Processing for analyzing meaning is ended when there is no longer an analyzer to be applied to or when the final meaning expression is obtained. The meaning expression 70 is outputted at this time.

The operation of the language phenomenon analyzers 41a through 41d will be described with reference to FIG. 5.

One language phenomenon analyzer 41 provided with an execution instruction by the controller 50 analyzes the language phenomenon, to which it has been assigned, based on a language knowledge base 80 storing knowledge necessary for analyzing language phenomena. For example, if the language phenomenon analyzer 41 is the case structure analyzer 41a, knowledge for analyzing case structure is stored in the language knowledge base 80. The grammar of structure analysis includes dependence-structure grammar and phase-structure grammar. In the former, analysis is performed while expressing the dependence relationship, in terms of sentence structure, between individual words. In the latter type of grammar, a plurality of mutually adjacent words are grouped together as one consolidated phrase. For a discussion of sentence-structure, see "Language Engineering" (1983), by Makoto Nagao.

Which knowledge stored in the language knowledge base 80 will be applied is decided by a language knowledge application unit 90 based on the states of the phrase relationship data 61 and meaning expression data 62. The results of analysis performed by applying the selected knowledge are stored in a solution candidate holding unit 120. Next, a solution selector 100 selects the best solution from among the solution candidates stored in the holding unit 120. The results of the selection are accepted by a common area updating unit 110, which causes these results to be reflected in the meaning expression data 62.

The operation of the invention will now be described using a specific input.

The operation of the invention will be described for a case where the Japanese sentence Taro ga katta hon wo Jiro no kanojo ga yonda is analyzed. Here Taro and Jiro are the names of people, katta means "bought", hon means "book" kanojo means "girl friend" and yonda means "read". Further, wo is a postpositional word which, in this case, indicates that the noun or pronoun preceding it is the object of the sentence, ga is a postpositional word which indicates that the noun or pronoun preceding it is the subject, and no is the postpositional word discussed earlier. Let this Japanese sentence be represented by "X". In other words, X: Taro ga katta hon wo Jiro no kanojo ga yonda.

The equivalent English sentence, represented by "Y", is as follows:

Y: "A girl friend of Jiro's read a book Taro bought."

Figure 6:
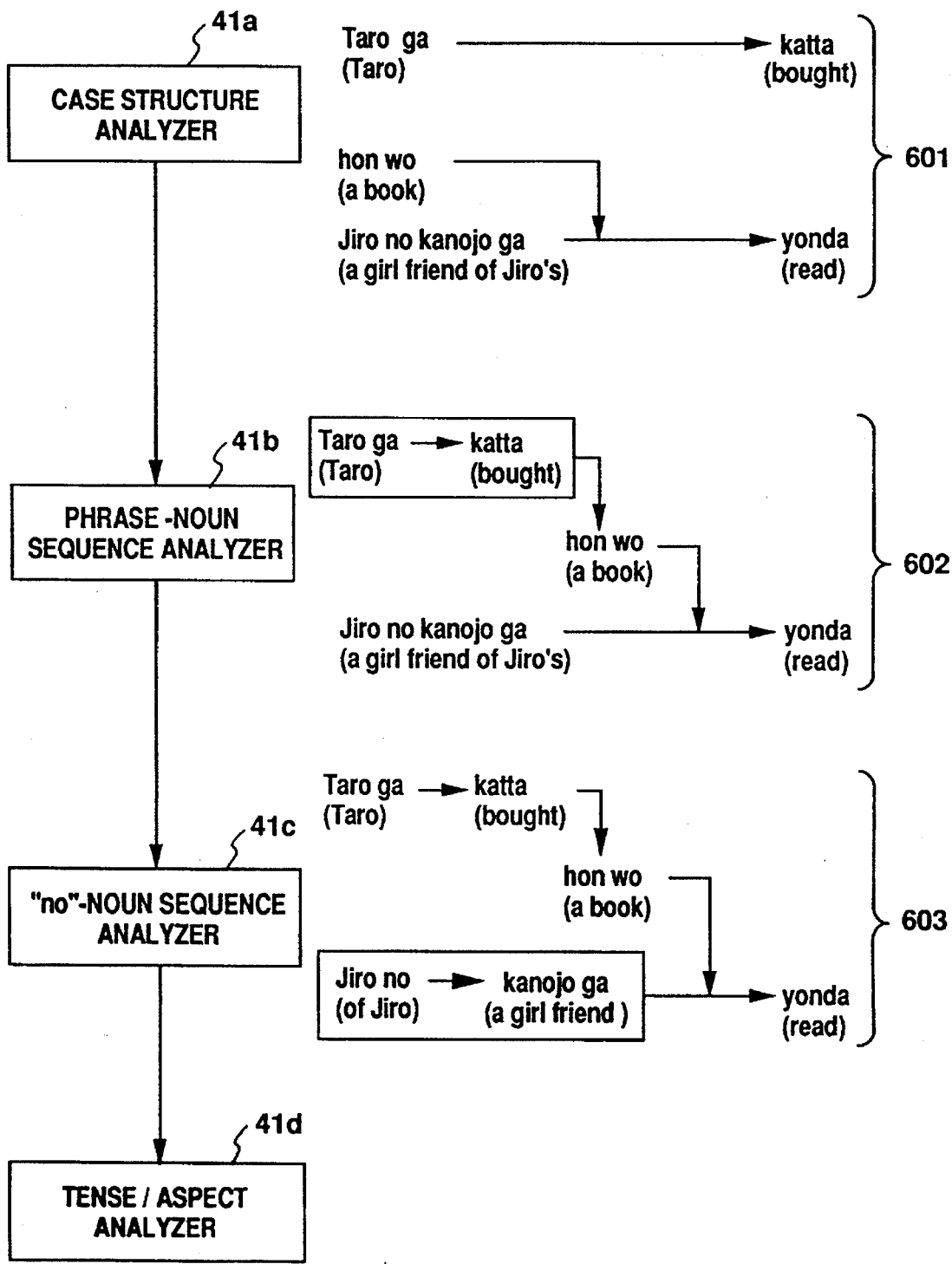
FIGS. 6 and 7 are diagrams for describing the operation of the embodied apparatus when specific inputs are applied thereto.
Figure 7:
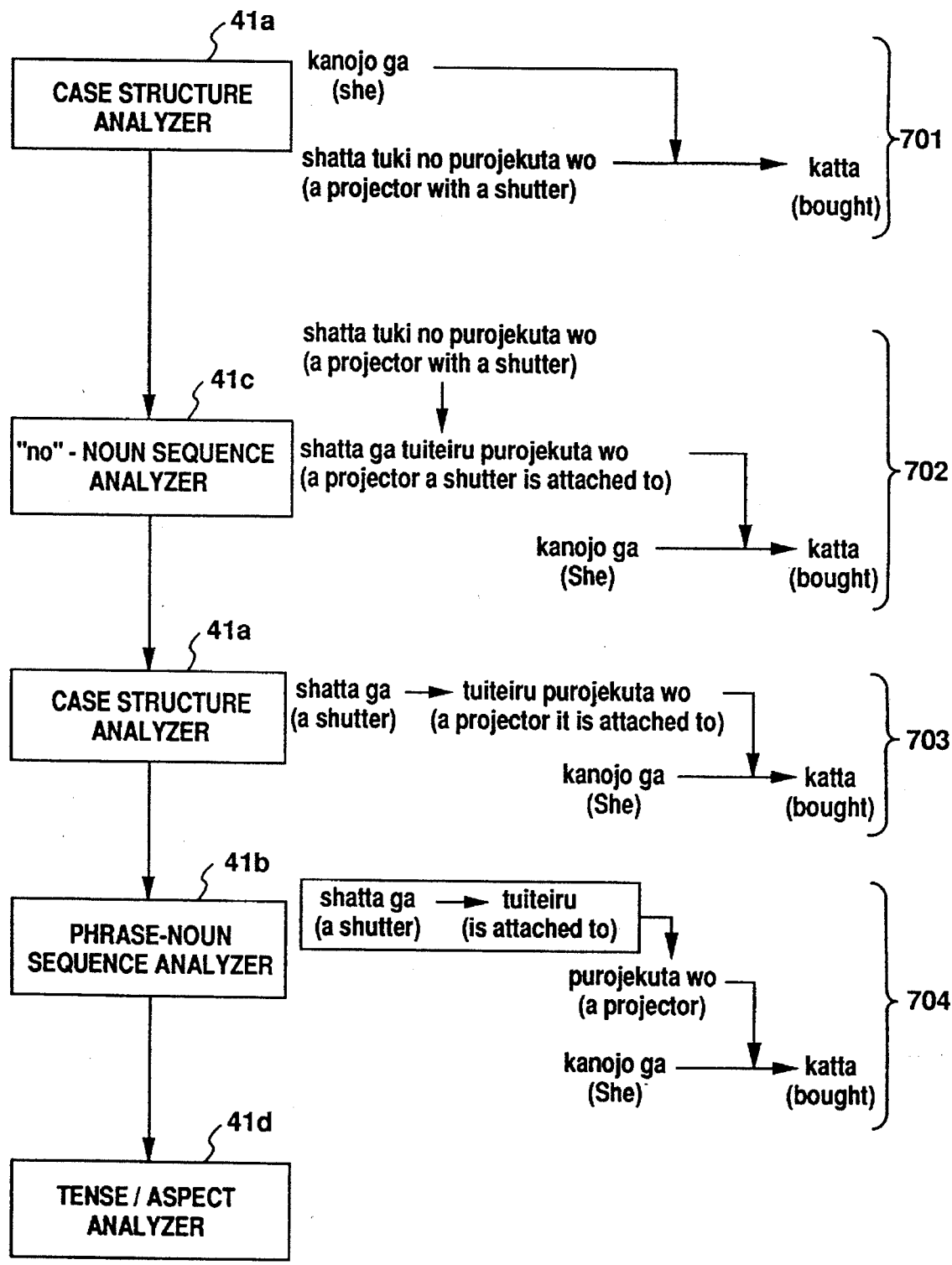

The present embodiment is adapted to extract a meaning expression from a Japanese text, and providing a translation from Japanese to English is not a direct object of the embodiment. However, in order to make the present invention understood by a reader not having a knowledge of Japanese, Japanese sentences which are the subject of analysis must be written as English sentences. The English sentences in the specification and drawings of this invention are presented from this point of view. Though the operation of this embodiment in which the Japanese sentences shown in FIGS. 6 and 7 are entered is to be understood in terms of the Japanese sentences, a phonetic representation of the Japanese using Roman characters and an English translation of the Japanese are shown together only for the purpose of assisting in an understanding of the invention. Accordingly, even though Japanese and English appear together in the drawings, the meaning analyzers do not generate English sentences.

The Japanese sentence X first is subjected to morpheme analysis by the analyzer 20 and to sentence-structure analysis by the analyzer 30, and the analytical results are stored in the memory 60 as the phrase relationship data 61.

The case structure analyzer 41a begins processing while referring to the structure of the sentence held in the phrase-relationship storage area 61 owing to the processing performed by the morpheme analyzer 20 and sentence-structure analyzer 30. The language knowledge application unit 90 analyzes the structure of the wording Taro ga katta (="Taro bought" in English) and of the wording hon wo Jiro no kanojo ga yonda (="a girl friend of Jiro's read a book" in English) using the language knowledge, which is for analyzing sentence structure, stored in the language knowledge base 80. The results of this analysis are held in the solution candidate holding unit 120. Thereafter, control shifts to the solution selector 100, which selects the single best solution from the solution candidates held in the holding unit 120 and delivers the selected solution to the common area updating unit 110. The latter stores the results in the memory 60 via the controller 50 as the processing results (namely the intermediate meaning expression 62) from the case structure analyzer 41a. This is indicated at 601 in FIG. 6. The analysis performed indicates that Taro modifies katta ( "bought" in English), and Jiro no kanojo ("a girl friend of Jiro's" in English) modifies yonda ("read" in English). In other words, it is analyzed that the predicates which correspond to the subjects Taro and Jiro no kanojo are katta and yonda, respectively.

The controller 50 observes the current state of the intermediate meaning expression 62 and selects the next analytical processing operation. In this example, control is shifted to the phrase-noun sequence analyzer 41b. As described above, the latter analyzes the structure in which one phrase, serving as a relative clause, modifies a noun or pronoun, namely the embedded structure of the sentence. The basic processing flow is the same as that of the case structure analyzer 41a.

More specifically, the phrase-noun sequence analyzer 41b refers to a language knowledge base 80b therefore, and a language knowledge application unit 90b applies each item of language knowledge and preserves the results in a solution candidate holding unit 120b. Next, a solution selector 100b selects the best candidate from the solution candidates and delivers the selected candidate to a common area updating unit 110b. The latter updates the intermediate meaning expression 62 inside the memory 60 via the controller 50. In this embodiment, the structure is analyzed by the phrase-noun sequence analyzer 41b as being a nested structure in which the phrase Taro ga ("Taro" in English)→ katta ("bought" in English) of the input sentence modifies the noun hon ("a book" in English), as indicated at 602 in FIG. 6.

Next, the controller 50 again observes the contents of the intermediate meaning expression 62 and selects the next analytical processing operation. In this example, control shifts to the "no"-noun sequence analyzer 41c. Here Jiro no kanojo ("a girl friend of Jiro's" in English) is analyzed. The no of this portion of the sentence is the aforementioned post-positional particle. By analyzing this post-positional particle, it is determined that Jiro has a possessive relationship with regard to kanojo, as indicated at 603 in FIG. 6.

Thereafter, and in a similar fashion, the controller 50 causes control to shift to the tense/aspect analyzer 41d, which proceeds to analyze information such as the tense off the sentence. Processing is then concluded.

Next, reference will be had to FIG. 7 to describe a procedure through which the following sentence is analyzed: Shatta tsuki no purojekuta wo kanojo ga katta. ("She bought a projector with a shutter." in English). Control in each unit of the language phenomenon analyzer 41, such as the case structure analyzer 41a, is performed in the same manner as in the case of FIG. 6.

In the case of this sentence, first the case structure analyzer 41a operates and determines that Kanojo ("She" in English) and shatta tsuki no purojekuta ("a projector with a shutter") modify katta ("bought" in English).

The controller 50 then observes the state of the intermediate meaning expression 62 in memory 60 and shifts control to the "no"-noun sequence analyzer 41c. The latter senses that the post-positional particle no is present in shatta tsuki no purojekuta and analyzes this particle. Using the language knowledge that the suffix tsuki is interpreted to mean "is attached to", the "no"-noun sequence analyzer 41c determines that Kanojo ("She" in English) and shatta ga tsuiteiru purojekuta ("a projector a shutter is attached to" in English) modify katta ("bought" in English), as shown at 702 in FIG. 7.

Thereafter, the controller 50 observes the state of the intermediate meaning expression 62 and again shifts control to the case structure analyzer 41a. Here it is determined that shatta ("shutter" in English) modifies tsuiteiru ("is attached to" in English), and that kanojo ("She" in English) and purojekuta ("a projector" in English) modify katta ("bought" in English), as indicated at 703 in FIG. 7.

Control is then shifted to the phrase-noun sequence analyzer 41b by the controller 50. As shown at 704 in FIG. 7, it is determined that the phrase shatta ga tsuiteiru ("a shutter is attached to" in English) modifies purojekuta ("a projector" in English).

The controller 50 then shifts control to the tense/aspect analyzer 41d, which proceeds to analyze information such as the tense of the sentence. Processing is then concluded.

A comparison of the embodiments described in conjunction with FIGS. 6 and 7 shows that, in the example of the sentence Taro ga katta hon wo Jiro no kanojo ga yonda, the language phenomenon analyzer 41, which is under the control of the controller 50, is applied in the order of the case structure analyzer 41a, the phrase-noun sequence analyzer 41b, the "no"-noun sequence analyzer 41c and the tense/aspect analyzer 41d, while in the example of the sentence Shatta tsuki no purojekuta wo kanojo ga katta, the language phenomenon analyzer 41 is applied in the order of the case structure analyzer 41a, the "no"-noun sequence analyzer 41c, the case structure analyzer 41a, the phrase-noun sequence analyzer 41b and the tense/aspect analyzer 41d under the control of the controller 50.

Thus, in the apparatus according to the present invention, the execution sequence of processing by the analyzers of the language phenomenon analyzing unit 41 is decided in appropriate fashion in dependence upon the input sentence.

Figure 8:
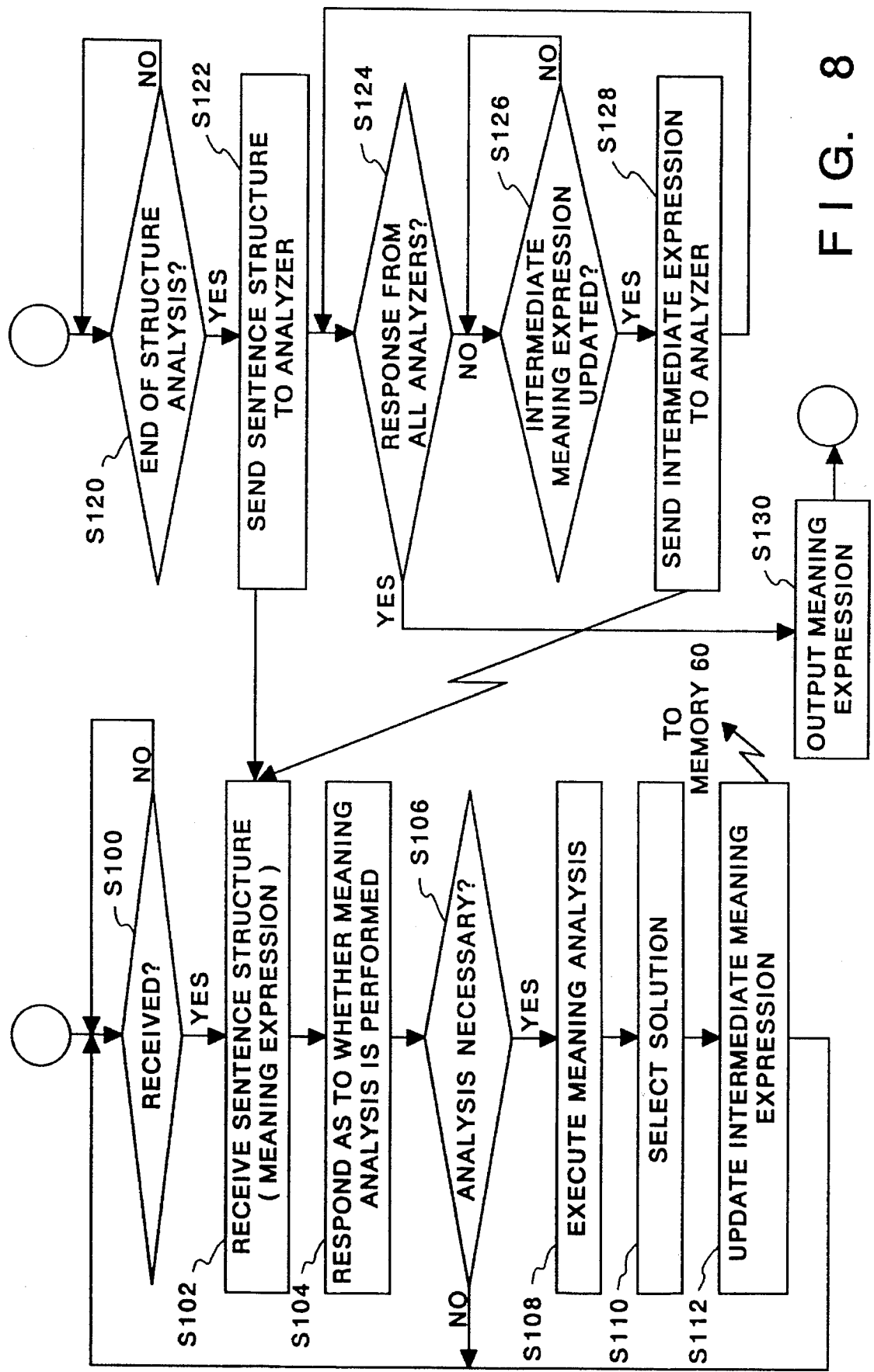
FIG. 8 is a flowchart for describing the control procedures of the controller and each analyzer in the embodiment of FIG. 3.

FIG. 8 is a flowchart illustrating the control execution procedures in the controller 50 and each of the language phenomenon analyzers shown in FIG. 5. The control procedure of the controller 50 is shown on the right side, and the control procedure of the language phenomenon analyzers is shown on the left side.

The controller 50 ordinarily establishes contact with the sentence-structure analyzer 30 at step S120 and waits for the sentence-structure analyzer S0 to end the sentence-structure analysis of the input sentence. Meanwhile, the case structure analyzer 41a, the phrase-noun sequence analyzer 41b, the "no"-noun sequence analyzer 41c and the tense/aspect analyzer 41d each wait at step S100 for the sentence structure to be sent from the controller 50.

As described above, the analytical result (sentence structure) from the sentence-structure analyzer 30 is stored in the memory 60 as the phrase relationship 61. The controller 50 sends this sentence structure to all of the language phenomenon analyzers, namely to the analyzers 41a through 41d. The input sentences sent to each of these analyzers are the aforementioned sentences Taro ga katta hon wo Jiro no kanojo ga yonda and Shatta tsuki no purojekuta wo kanojo ga katta, by way of example. The sentence-structure data 61 includes structure information in addition to the input sentence.

The analyzers 41a through 41d receive the sentence-structure data and other information at step S102, whereupon these analyzers use the various knowledge bases 80 to determine, based on the data received, whether meaning analysis is possible. Since the input 61 analyzed by the sentence-structure analyzer 30 does not possess sentence-structure information, the phrase-noun sequence analyzer 41b, the "no"-noun sequence analyzer 41c and the tense/aspect analyzer 41d are incapable of performing meaning analysis. Accordingly, at step S104, the controller 50 is informed of the fact that the analyzer 41a will perform analysis, and of the fact that the other analyzers 41b through 41c will not perform analysis. The analyzer (the case structure analyzer 41a in the examples of FIGS. 6 and 7) which has informed the controller that it will perform analysis executes meaning analysis at steps S108 through S112, and the results are used to update the intermediate meaning expression 62 in the memory 60.

The controller 50 which has received the communication from each analyzer determines whether at least one of the analyzers 41 performs meaning analysis. In a case where the controller has been notified that none of the analyzers 41 performs analysis, this means that the intermediate meaning expression in memory 60 is a meaning expression that has been obtained upon the conclusion of all necessary meaning analysis. Therefore, this meaning expression is outputted at step S130.

In the examples of FIGS. 6 and 7, it is known that the case structure analyzer 41a performs analysis. The system waits for the communication from the analyzers 41 indicating that analysis has ended. End of analysis can be determined by the fact that the intermediate meaning expression 62 has been updated.

When the partial meaning analysis obtained by the analyzer is concluded, the program proceeds to step S128, where the updated meaning expression 62 is sent to all analyzers 41.

The updated meaning expression is 602 in the example of FIG. 6 and 702 in the example of FIG. 7. Each analyzer 41 which has received this meaning expression determines whether it itself is required to perform meaning analysis and, upon making the determination, informs the controller 50 accordingly at step S104. In the example of FIG. 6, the controller is informed of the fact that the phrase-noun sequence analyzer 41b performs analysis. In the example of FIG. 7, the controller is informed of the fact that solely the "no"-noun sequence analyzer 41c performs analysis.

When the phrase-noun sequence analyzer 41b or "no"-noun sequence analyzer 41c ends analysis in the Example of FIG. 6 or FIG. 7, the result of analysis is updated in the memory 60 at step S112. The controller 50 then again sends the updated intermediate expression 62 to all of the analyzers 41. The updated intermediate expression is 603 in the example of FIG. 6 and 703 in the example of FIG. 7. Next, the analyzer which informs the controller of the fact that it is capable of analysis at step S104 is the "no"-noun sequence analyzer 41c in the example of FIG. 6 and the sentence-structure analyzer 41a in the example of FIG. 7.

Thus, the cycle in which the controller 50 successively sends the updated meaning expression to all of the analyzers 41 and only the analyzer capable of performing analysis executes this analysis is repeated.

When the tense/aspect analysis eventually ends in the examples of FIGS. 6 and 7, each of the analyzers 41 should inform the controller of the fact that analysis is unnecessary even if the controller 50 sends the intermediate meaning expression 62 to the analyzers 41. The controller 50 then proceeds to step S130 to end processing.

Thus, in the control procedure of FIG. 8, each of the meaning analyzers 41 determines whether or not it itself performs analysis, sends the result of this determination to the controller 50 and executes meaning analysis processing. Owing to such an arrangement, the following advantages are obtained.

(1) The structure of an input sentence is subjected to meaning analysis in accordance with the optimum meaning analysis sequence. Accordingly, when an input sentence having a different structure is analyzed, meaning analysis is performed in a different sequence conforming to this input sentence.

As a result, correct meaning analysis can be realized.

(2) Each of the meaning analyzers has its own specific knowledge data base for meaning analysis, as well as a data base solely for determining (at step S104) whether the particular analyzer itself is capable of performing meaning analysis. Since the knowledge data base 80, language knowledge application unit 90 and solution selector 100 in each analyzer are restricted to the meaning analysis assigned to the particular analyzer, the processing in each meaning analyzer does not become too complicated.

(3) For the foregoing reason, the construction of each analyzer is specially designed for the particular purpose of that analyzer. This means that a modification in one analyzer can be made without affecting the other analyzers. Accordingly, modifications can be made with ease.

In addition, the following advantages are obtained by providing, for the plurality language phenomenon analyzers which execute different meaning analysis processing operations, a common storage area accessible by each of the language phenomenon analyzers, as well as a single controller for collectively controlling all of the language phenomenon analyzers:

(4) Each of the language phenomenon analyzers can be formed independently, and modifications can be made independently for each and every language phenomenon analyzer.

(5) Since the controller controls the plurality of language phenomenon analyzers, the overall processing efficiency of the meaning analyzers is improved.

(6) Meaning phenomenon analyzers that are unnecessary can be removed with ease when the system is constructed.

The present invention can be modified in various ways without departing from the scope of the claims. For example, though the present invention is applied to meaning analysis of Japanese sentences in the foregoing embodiment, the invention can be applied also to meaning analysis of English sentences. This is because the English language does not possess case-postpositional particles but does possess prepositions, which are similar. Accordingly, the present invention can be applied to a Japanese-English machine translating apparatus in which expressions of meaning are extracted from the Japanese language) or from the English language) and then converted into English (or Japanese).

Though the analyzers 41 which perform meaning analysis function simultaneously in the above-described embodiment, this does not impose a restriction upon the present invention.

Furthermore, in the foregoing embodiment, each meaning analyzer 41 determines whether it itself is required to perform meaning analysis, only the analyzer which has decided that meaning analysis is necessary executes this analysis, and this analyzer stores the analytical results in memory. However, a modification can be adopted in which an intermediate memory is not required. Specifically, it can be arranged so that the analyzers 41 which have-decided that meaning analysis is possible output their analytical results simultaneously to a network to which the analyzers are connected.

In the foregoing embodiment, the controller 50 performs control in such a manner that the updated meaning expressions are sent to each analyzer sequentially in order to be analyzed. However, if each analyzer 41 operates in the following manner, the controller 50 which controls these analyzers collectively will be unnecessary. Specifically, the controller 50 will be unnecessary if each analyzer 41 becomes capable of starting processing in response to the end of processing in the other analyzers, it is determined by a particular analyzer itself whether current results of processing are capable of being analyzed, ranking is established among analyzers in such a manner that competition will not occur if processing is possible simultaneously in the plurality of analyzers, and analysis is executed in a case where analysis is impossible in a higher ranked analyzer but possible in the particular analyzer itself.

The present invention is not limited to the above embodiments and various changes and modifications can be made within the spirit and scope thereof of the present invention. Therefore, to apprise the public of the scope of the present invention, the following claims are provided.

What is claimed is:

1. A natural language processing apparatus for performing processing to analyze the meaning of an input sentence entered in the form of a natural language, comprising:

memory means for storing subjects of analysis;

input means for applying the input sentence, which is an initial one of the subjects of analysis, to said memory means;

a plurality of meaning analyzing means for analyzing the meaning of the input sentence, each of said plurality of meaning analyzing means performing different meaning analyzing operations, and being capable of outputting a result of its analysis to said memory means to update a subject of a subsequent analysis; and control means for sending a subject of analysis stored in said memory means to each of said plurality of meaning analyzing means when the subject of analysis is updated in said memory means, wherein each of said plurality of meaning analyzing means determines whether respective meaning analysis is executable with regard to the subject of analysis sent by said control means and sends a result of the determination to said control means, and wherein if at least one of the plurality of meaning analyzing means sends a determination that an analysis of the subject of analysis is executable, said control means selects one from among said at least one of the plurality of meaning analyzing means on the basis of the results of the determination sent by said plurality of meaning analyzing means and causes the selected one of said plurality of meaning analyzing means to perform a meaning analysis on the subject of analysis is sent by said control means and output a result of its meaning analysis to said memory means to update the subjects of analysis.

2. The processing apparatus according to claim 1, wherein a first one of said meaning analyzing means analyzes the case structure of the input sentence, and a second one of said means analyzing means analyzes a clause modifying a noun or a pronoun.

3. The processing apparatus according to claim 1, wherein a first one of said meaning analyzing means analyzes the case structure of the input sentence, and a second one of said meaning analyzing means analyzes a phrase modifying a noun or a pronoun.

4. The processing apparatus according to claim 1, wherein each of said plurality of meaning analyzing means transmits a result of the determination to said control means, and said control means outputs the subject of analysis as a result of all of said meaning analyzing means, if each of the plurality of meaning analyzing means determines that its respective meaning analysis is not executable.

5. A method for controlling an apparatus having a plurality of meaning analyzers, each of which performs different analysis operations, to analyze the meaning of a sentence in the form of a natural language, the method comprising the steps of:

inputting a sentence in the form of the natural language into the apparatus;

storing the input sentence as an initial subject of analysis in a memory;

sending the subject of analysis from the memory to each of said plurality of meaning analyzers;

determining whether each of said plurality of meaning analyzers can execute its respective analysis operations with regard to the subject of analysis received from the memory;

if at least one of the plurality of meaning analyzers has determined that an analysis of the subject of analysis is executable, selecting one meaning analyzer from among said at least one of the plurality of meaning analyzers on the basis of the results of the determination;

analyzing the meaning of the subject of analysis in the memory by the selected one of the plurality of meaning analyzers; and updating the subject of analysis in the memory by the result of said analyzing step.

6. A method according to claim 5, wherein said determining, analyzing and updating steps are repeated sequentially, unless none of the operations is determined for performing the determining step.

* * * * *

UNITED STATES PATENT AND TRADEMARK OFFICE
CERTIFICATE OF CORRECTION

PATENT NO. : 5,590,039
DATED : December 31, 1996
INVENTOR(S) : YUJI IKEDA, ET AL.

It is certified that error appears in the above-indentified patent and that said Letters Patent is hereby corrected as shown below:

ON THE COVER PAGE:

[56] References Cited:

OTHER PUBLICATIONS:

"Outline of Machine Translation Project of the Science and Technology Agency", by Makoto, Nagao et al." should read --"Outline of Machine Translation Project of the Science and Technology Agency", by Makoto Nagao et al.--.

UNITED STATES PATENT AND TRADEMARK OFFICE
CERTIFICATE OF CORRECTION

PATENT NO. : 5,590,039
DATED : December 31, 1996
INVENTOR(S) : YUJI IKEDA, ET AL.

It is certified that error appears in the above-indentified patent and that said Letters Patent is hereby corrected as shown below:

COLUMN 12:

Line 3, "have-decided" should read --have decided--.

Line 59, "is" should be deleted.

Line 66, "means analyzing" should read --meaning analyzing--.

Signed and Sealed this

Tenth Day of June, 1997

Attest:

BRUCE LEHMAN

Attesting Officer　　　Commissioner of Patents and Trademarks